No. 836,152. PATENTED NOV. 20, 1906.
D. TARBOX.
NUT LOCK.
APPLICATION FILED MAR. 17, 1905.
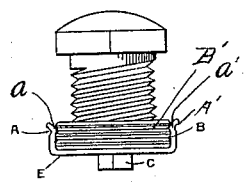
Fig: 1
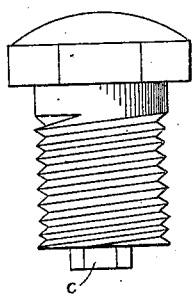
Fig: 6
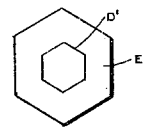
Fig: 4
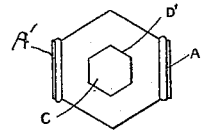
Fig: 2
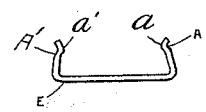
Fig: 5
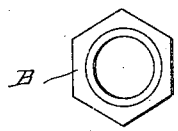
Fig: 3
WITNESSES:
E. S. Miller
Edna Christy
INVENTOR.
David Tarbox
BY W. L. Miller
ATTORNEY.
THE NORRIS PETERS CO., WASHINGTON, D. C.

UNITED STATES PATENT OFFICE.

DAVID TARBOX, OF CEDARVILLE, OHIO.

NUT-LOCK.

No. 836,152.  Specification of Letters Patent.  Patented Nov. 20, 1906.

Application filed March 17, 1905. Serial No. 250,692.

*To all whom it may concern:*

Be it known that I, DAVID TARBOX, a citizen of the United States, residing at Cedarville, Greene county, Ohio, (whose post-office address is Cedarville, Ohio,) have invented a certain new and useful Device Pertaining to Nut-Locks; and I declare that the following is a full, clear, and exact specification of said invention.

My invention relates to a device for locking the nut upon the ordinary bolts which are used to fasten the rails together; and my device consists of a novel arrangement which fits over the nut and engages the side of the same, thereby holding the nut in place.

A more complete description is had by reference to the drawings hereto attached and made a part hereof, and in which the several parts are set forth in detail.

Figure 1 is a side view, in elevation, of a bolt with a nut thereon, illustrating the locking means embodied in this invention. Fig. 2 is a top plan view of the locking member. Fig. 3 is a plan view of a nut. Fig. 4 is a bottom plan view of the locking member. Fig. 5 is a side elevation of the locking member, and Fig. 6 is an enlarged side view of the bolt of Fig. 1.

In the physical application of the principles of my invention I employ a bolt of ordinary construction and provide the same with a central extension, as C, preferably of reduced diameter and formed with angular faces.

The nut B, which in this instance is illustrated of hexagonal form, has the usual inner screw-threads and is adapted to be screwed onto the bolt in customary manner. On its outer sides said nut is corrugated or roughened, as at B', these corrugations being provided to furnish reception means or bearings for portions of the locking member of the device.

To secure the nut and hold it rigidly and immovably on the bolt, I utilize a locking member which consists of a flat plate or washer E, having a central perforation or hole $c$ therein, the faces D' of which conform to the shape of the projection or extension C of the bolt. The plate or washer is also formed with integral upright spring flanges or arms, as A A'. These spring-arms are each formed near their ends with a projection $a$ and $a'$, respectively, adapted to engage the corrugations or roughened portion of the nut to lock the same on the bolt and prevent turning thereof. After the nut is turned to position on the bolt by means of its threads the locking plate or washer is slipped over the extension C of the bolt and the spring-arms clasp the sides of the nut, the projections $a$ and $a'$ engaging the corrugations B' of the nut to hold and secure the same, thereby preventing turning of the nut. The spring-arms A and A' engage the sides of the nut and their tension prevents movement of the nut, except when they are released.

Having thus fully described my invention, what I claim as new, and desire to secure by Letters Patent, is—

The combination in a nut-lock with a threaded bolt having a reduced hexagonal-shaped head, an angular nut engaging the threads of the bolt, and provided with longitudinal corrugations covering the entire area of its sides; a flat washer having a hexagonal opening complementary to the head of the bolt and adapted to fit over said head; a pair of upwardly-projecting spring-arms located on opposite sides of said washer, and inwardly-projecting angular portions or bends formed at the outer ends of said arms adapted to seat in the longitudinal corrugations on the nut, substantially as described.

In witness whereof I have hereunto set my hand and subscribed my name to the above specification, this 9th day of March, 1905, at Xenia, Ohio, in the presence of two witnesses.

DAVID TARBOX.

Witnesses:
W. L. MILLER,
E. S. MILLER.